C. T. Shoemaker,
Saw Teeth,

No. 55,375.        Patented June 5, 1866.

Witnesses:
Wm Albert Steel
S. Newton Goding

Inventor
C. T. Shoemaker
By his Atty
H. Howson

UNITED STATES PATENT OFFICE.

CHARLES T. SHOEMAKER, OF PHILADELPHIA, PENNSYLVANIA.

IMPROVEMENT IN SAWS.

Specification forming part of Letters Patent No. 55,375, dated June 5, 1866.

*To all whom it may concern:*

Be it known that I, C. T. SHOEMAKER, of Philadelphia, Pennsylvania, have invented an Improvement in Saws; and I do hereby declare the following to be a full, clear, and exact description of the same, reference being had to the accompanying drawings and to the letters of reference marked thereon.

My invention consists of a mode, fully described hereinafter, of securing detachable teeth to the bodies of circular and other saws.

In order to enable others skilled in the art to make my invention, I will now proceed to describe the manner of carrying it into effect.

Figure 1:
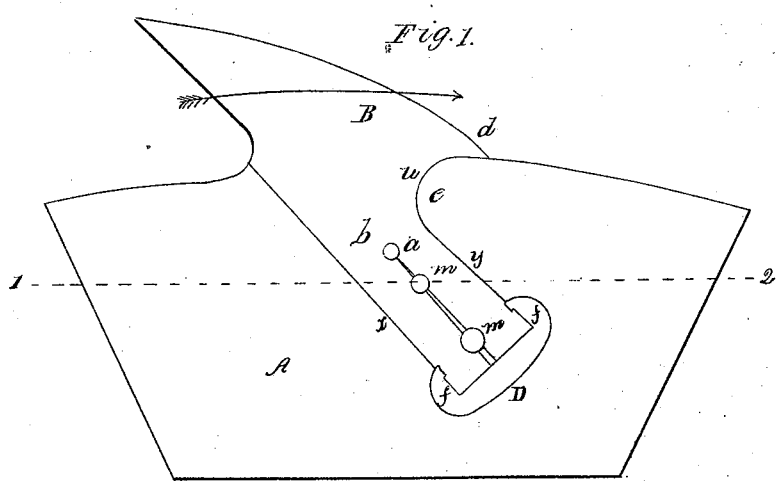
Figure 2:
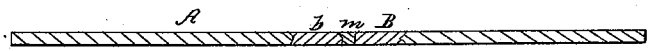
Figure 3:
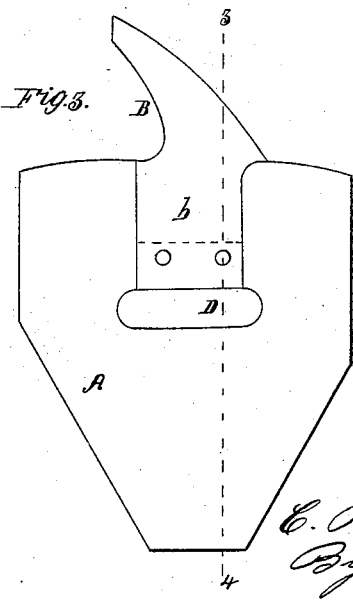

On reference to the accompanying drawings, which form a part of this specification, Figure 1 represents part of a circular saw, and illustrates my improved mode of securing teeth to the same; Fig. 2, a sectional plan on the line 1 2, Fig. 1; Fig. 3, a modification of Fig. 1, and Fig. 4, a vertical section on the line 3 4, Fig. 3.

On reference to Figs. 1 and 2, A represents a portion of a circular saw, and B the tooth secured to the same. The tooth has a projection, $b$, which is split from its outer end to the hole $a$, and the tooth has another projection, $d$, of the form represented in the drawings, so as to fit snugly to the rounded portion $e$ of the saw. In the edges of that portion of the tooth which is fitted to the body of the saw—that is to say, in the concave edge $u$ and the edges $x$ and $y$—are formed V-shaped grooves, adapted to similarly-shaped ribs formed on the corresponding edges of a recess to which the tooth is fitted. The projection $b$ is, in the first instance, so contracted that it can be readily introduced into the recess; but after its introduction taper-pins $m\ m$ are driven into taper-holes drilled in the tooth at one or more points where the projection $b$ is split, thereby expanding the said projection and causing its grooved edges to fit tightly against the V-shaped ribs formed on the edges of the recess. After the taper-pins $m$ have been driven tightly into their holes the projecting ends (if there be any) are filed off and the opposite ends of the pins are riveted, so that they cannot be shaken loose by the jarring of the saw.

When it is borne in mind that the strain to which the tooth is subjected is in the direction of the arrow it will be seen that the projection $d$ and its rounded rest $e$ have an important duty to perform—namely, that of resisting the greater portion of the strain to which the tooth is subjected, and which, in the absence of the said projection $d$, would have to be borne entirely by the split projection $b$. Although this projection, when expanded, may serve to retain the tooth in its place, additional security will be afforded by the piece D, of the form illustrated, this piece having projections $f\ f$, embracing the end of the projection $b$, and fitting into notches in the edge of the same, the piece being secured to the tooth in any suitable manner, and not to the saw, for one of the main objects of my invention is to prevent the riveting of any part of the tooth to the saw, which would become warped by such an operation.

In the modification illustrated in Fig. 3 the portion $b$ is not split, as in Fig. 1, and it has parallel or nearly parallel edges with V-grooves.

Figure 4:

This tooth depends for its retention in the recess of the saw entirely on the piece D, the upper portion of which is cut away, as seen in Fig. 4, and is riveted to the lower portion of the projection $b$, which is also cut away.

I claim as my invention and desire to secure by Letters Patent—

1. The tooth B, with its split projection $b$ and grooved edges, adapted to a recess in the saw, and secured thereto by taper-pins $m\ m$, or their equivalents, all substantially as set forth.

2. A piece, D, formed fitted to an opening in the saw and adapted and secured to the tooth for the retention of the same, all substantially as set forth.

In testimony whereof I have signed my name to this specification in the presence of two subscribing witnesses.

C. T. SHOEMAKER.

Witnesses:
CHARLES E. FOSTER,
JOHN WHITE.